(12) United States Patent  
Feeler et al.

(10) Patent No.: US 7,425,992 B2  
(45) Date of Patent: Sep. 16, 2008

(54) METHOD AND APPARATUS FOR UPGRADING A TELEVISION SYSTEM

(75) Inventors: James Lee Feeler, Brush Prairie, WA (US); Bryan Severt Hallberg, Vancouver, WA (US); Kim Wells, Washougal, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 580 days.

(21) Appl. No.: 10/976,388

(22) Filed: Oct. 29, 2004

(65) Prior Publication Data

US 2006/0092323 A1      May 4, 2006

(51) Int. Cl.  
H04N 5/44    (2006.01)

(52) U.S. Cl. .................. 348/553; 348/552; 725/152; 717/168; 711/103; 713/2

(58) Field of Classification Search ............. 348/553, 348/552; 725/132, 140, 152; 711/103; 713/2; 710/240; 717/168  
See application file for complete search history.

(56) References Cited

U.S. PATENT DOCUMENTS 5,619,250 A * 4/1997 McClellan et al. .......... 725/132

| 5,666,293 | A | * | 9/1997 | Metz et al. ............ 709/22 |
| 5,940,074 | A | * | 8/1999 | Britt et al. ............ 715/749 |
| 6,205,513 | B1 | * | 3/2001 | Godicke et al. ............ 711/103 |
| 6,970,960 | B1 | * | 11/2005 | Sarfati ............ 710/106 |
| 2003/0084440 | A1 | | 5/2003 | Lownes | |

FOREIGN PATENT DOCUMENTS

EP    0 993 183 A2    4/2000  
GB    2 381 093        4/2003

OTHER PUBLICATIONS 0 993 183 A3, Search Report.

* cited by examiner

*Primary Examiner*—M. Lee  
(74) *Attorney, Agent, or Firm*—Stolowitz Ford Cowger LLP

(57) ABSTRACT

A television upgrade system allows a consumer to upgrade applications or features in a television (TV) simply by inserting an external device containing an upgrade file into the TV. The TV then executes a boot loader code which automatically replaces an executable code for applications or features currently in the TV with the new or upgraded executable code from the upgrade file. A consumer can also upgrade the boot loader code that maps out where the executable code for the different applications or features are located in memory. This allows the TV to be completely reconfigured for a wider variety of new applications and features. A verification operation can be performed to prevent the TV from being reconfigured with incorrect versions of the boot image and to avoid unauthorized files from being loaded into the TV.

21 Claims, 7 Drawing Sheets

MEMORY MAP

| START ADDRESS | CONTENTS |
|---|---|
| 0x0010:0000 | BOOT LOADER CODE |
| 0x0011:0000 | DVG SRAM CODE START ADDRESS |
| 0x0011:0004 | DVG SRAM CODE SIZE |
| 0x0011:0008 | DVG SDRAM CODE FLASH START ADDRESS |
| 0x0011:000C | DVG SDRAM CODE SDRAM START ADDRESS |
| 0x0011:0010 | DVG SDRAM CODE SIZE |
| 0x0011:0014 | DVG SDRAM CODE ENTRY POINT |
| 0x0011:0018 | FLASH DISK IMAGE START ADDRESS |
| 0x0011:001C | FLASH DISK IMAGE SIZE |
| 0x0011:0020 | MP BOOT CODE START ADDRESS |
| 0x0011:0024 | MP BOOT CODE SIZE |
| 0x0011:0028 | MP SRAM CODE START ADDRESS |
| 0x0011:002C | MP SRAM CODE SIZE |
| 0x0011:0030 | MP SDRAM CODE FLASH START ADDRESS |
| 0x0011:0034 | MP SDRAM CODE SDRAM START ADDRESS |
| 0x0011:0038 | MP SDRAM CODE SIZE |
| 0x0011:003C | MP SDRAM CODE ENTRY POINT |
| 0x0011:0040 | SIEGE ROM FS CODE START ADDRESS |
| 0x0011:0044 | SIEGE ROM FS CODE SIZE |
| 0x0011:0048 | FLASH LIST START ADDRESS |
| 0x0011:004C | FLASH LIST SIZE |
| 0x0011:0050 | SRAM STORE START ADDRESS |
| 0x0011:0054 | SDRAM STORE START ADDRESS |
| 0x0011:0058 | BOOT IMAGE FORMAT VERSION NUMBER |
| 0x0011:005C | BOOT IMAGE VERSION NUMBER |
| 0x0011:0060 | BINARY DATA |

FIG.7

METHOD AND APPARATUS FOR UPGRADING A TELEVISION SYSTEM

BACKGROUND

A consumer cannot upgrade features in a Television (TV). For example, a television manufacturer may come up with new hardware or software TV applications or features, such as a new remote or wireless control operation. Currently there is no way for the consumer to download these new hardware or software applications into their existing TV. This forces the consumer to purchase a new TV every time they wish to add or upgrade features in their current TV.

The present invention addresses this and other problems associated with the prior art.

SUMMARY OF THE INVENTION

A television upgrade system allows a consumer to upgrade applications or features in a television (TV) simply by inserting an external device containing an upgrade file into the TV. The TV then executes a boot loader which automatically replaces applications or features currently in the TV with the new or upgraded applications or features from the upgrade file. The boot loader extracts the executable code which contains the upgrade applications or features from the file, maps out different locations for different portions of the executable code, and places them in memory as appropriate. A consumer can also upgrade the boot loader code, this allows the TV to be completely reconfigured for a wider variety of new applications and features. A verification operation can be performed to prevent the TV from being reconfigured with incorrect versions of the boot loader or the executable code and to avoid unauthorized files from being loaded into the TV.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 7 is an example of a memory map used during the upgrade.

DETAILED DESCRIPTION

Figure 1:
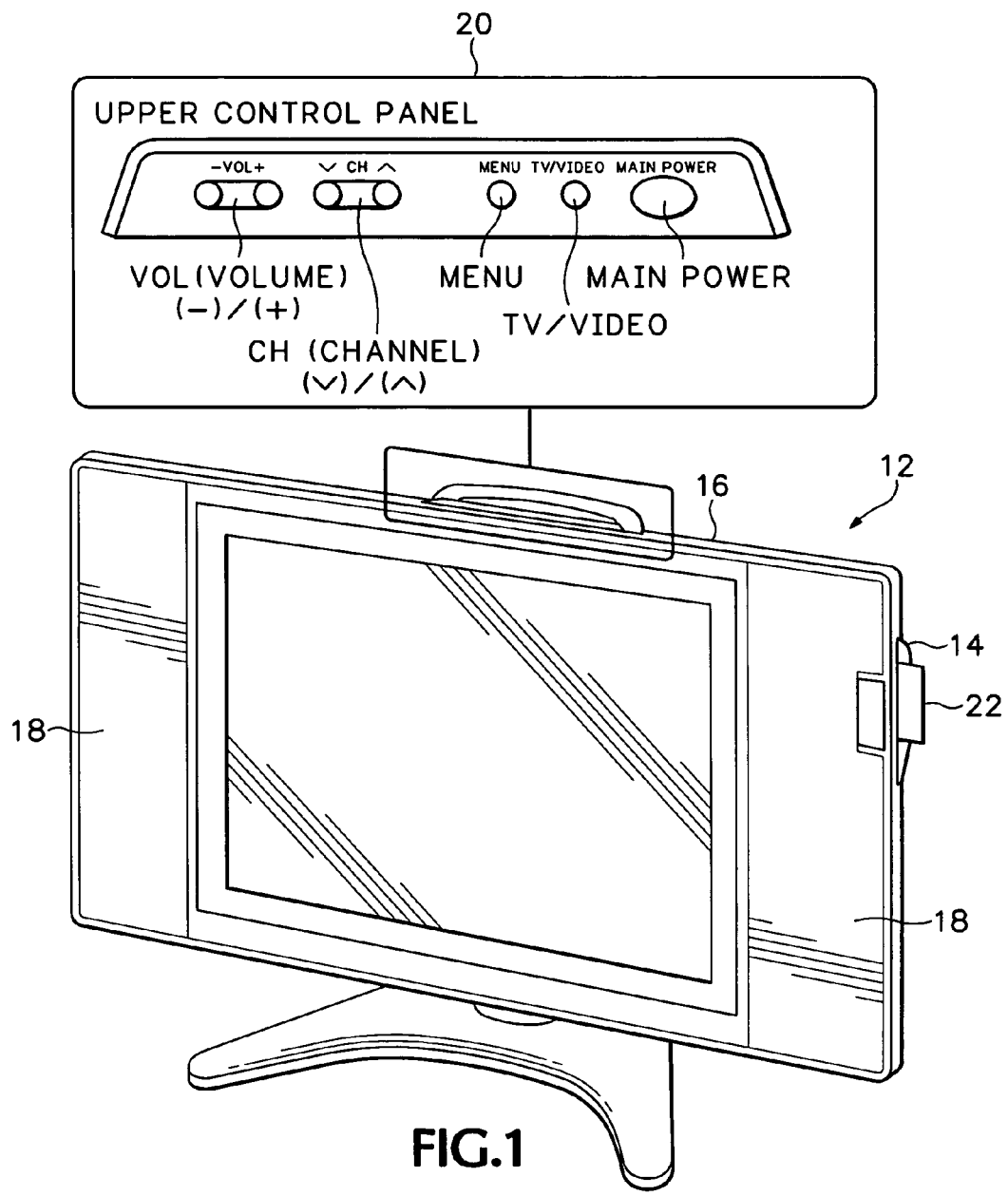
FIG. 1 shows a television computing system that provides an automatic upgrade operation.

FIG. 1 shows a television (TV) 12 with an automatic TV upgrade system 14. The TV 12 includes a TV screen 16, speakers 18 and a control panel 20. The control panel 20 can include conventional volume, channel, menu, TV/video and power buttons. The TV 12 includes conventional television operations but also includes novel computing circuitry described below that provides a wide variety of novel hardware and software operations and features.

The TV upgrade system 14 allows a wide variety of TV applications and features to be automatically upgraded by a consumer without having to purchase a new TV. The upgrade system 14 can upgrade the executable code for different computing devices in the TV or can upgrade both the executable code and the boot loader code.

In one example, a PC card 22 contains the one or more upgrade files that are used to replace or upgrade the code currently loaded in the TV 12. However, it should be understood that any external interface can be used for delivering upgrade files. For example, the upgrade files may be contained on a floppy disc or a Compact Disc (CD) that are read by disc drives operating in or connected to the TV 12. Alternatively, the upgrade files may be transferred over a Local Area Network (LAN), Universal Serial Bus (USB), serial interface, or any other external interface that can be connected to the TV 12. In a preferred embodiment, the upgrades are through a PC Card interface but alternative interfaces are possible with modifications to the boot loader.

Figure 2:
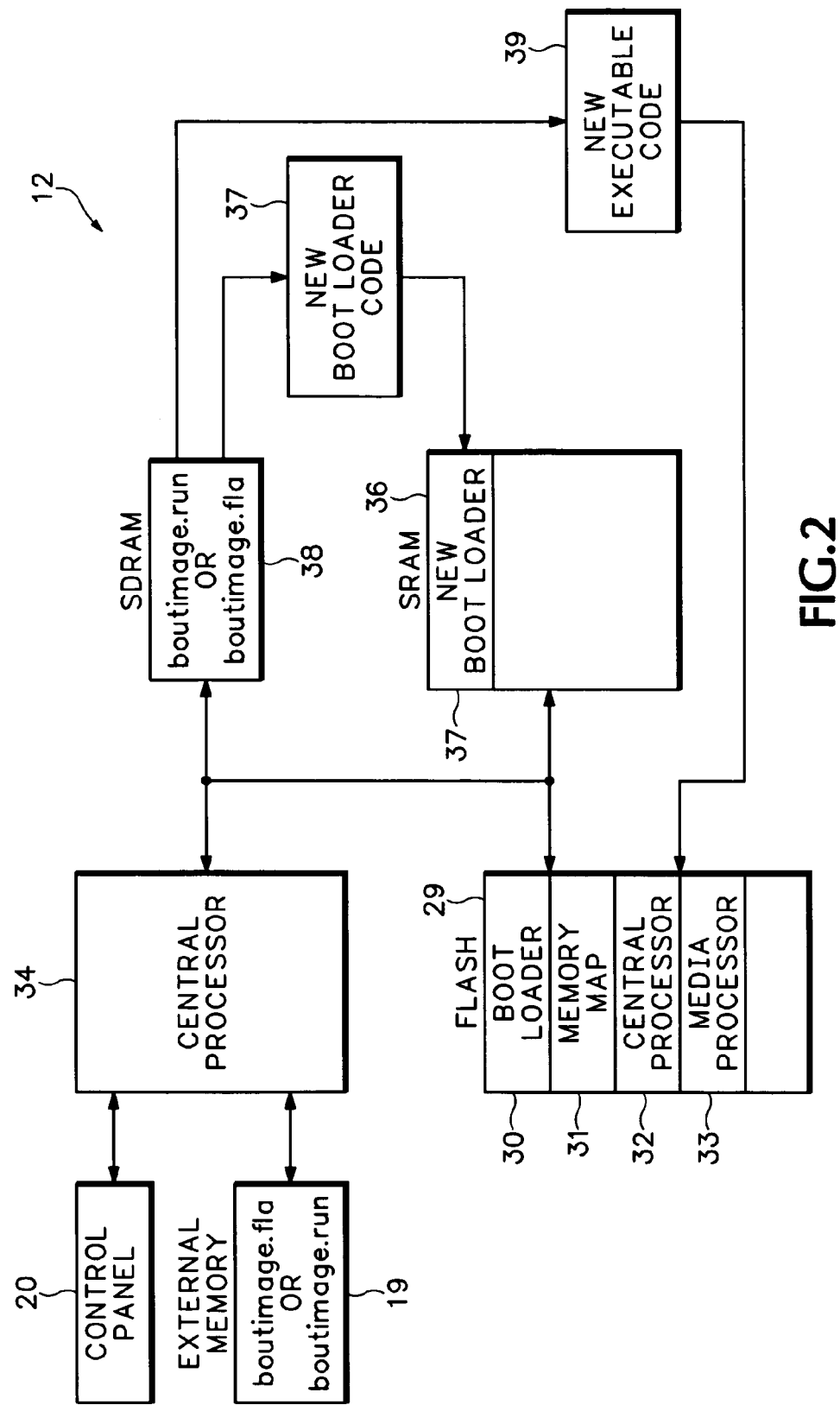
FIG. 2 is a block diagram showing some of the components in the television computing system used for automatic upgrade operations.

FIG. 2 shows one example of hardware block diagram that may reside within the TV 12. A central processor 34 communicates with the user control panel 20 and with an external memory device 19, such as the PC card 22 previously shown in FIG. 1. The central processor 34 in one example is a digital Video/Graphic (DVG) processor but can be any processor that is used for booting software in a computing system. In addition to the processor 34, the TV 12 may include additional processors, such as a Media Processor (MP) and a TV Central Processing Unit (CPU). These additional processors are described in more detail below.

The TV 12 includes flash memory 29 that contains a boot loader 30, a memory map 31 and different executable code 32 and 33 used for operating different devices in the TV 12. The TV 12 may also include a Static Random Access Memory (SRAM) 36 and a Synchronous Dynamic Random Access Memory (SDRAM) 38. In other computing systems, the memories 36 and 38 may be other types of Random Access Memory (RAM) such as Internal SRAM (ISRAM) or Dynamic Random Access Memory (DRAM).

The boot loader 30 is software that is executed by the central processor 34 upon power-up of the TV 12. The boot loader 30 may be used to initialize system clocks, internal memory 36 and 38, external memory interfaces, general input/output signals, serial interfaces, and digital video inputs and outputs. The boot loader 30 is also programmed to automatically upgrade software in the field, for example, when a TV owner inserts the PC card 22 (FIG. 1) into a PCMCIA port.

The boot loader 30 loads the executable code 32 and 33 into different memory devices that is then used to operate different processors in the TV 12. For example, the boot loader 30 loads central processor executable code 32 into SRAM 36 and SDRAM 38 that is used to operate the central processor 34. The media processor executable code 33 is loaded into other memory or memory locations for operating a media processor (see FIG. 5).

After the TV 12 is powered up, the processor 34 automatically jumps to the start of flash memory 32 and begins executing the boot loader 30. The tasks performed by the boot loader 30 depend on the specific hardware configuration of the television system 12.

Two different upgrade files bootimage.fla or bootimage.run may be used via the external memory 22 for upgrading the TV 12. A bootimage.fla file is used for updating the executable code in flash memory 29. The bootimage.run file is used for upgrading the boot loader code and the memory map in flash memory 29. The bootimage.fla and bootimage.run files may contain multiprocessor binary machine code, graphics for displaying the upgrade progress, and designated application specific memory areas such as flash disk space, Read Only Memory (ROM) File System area, etc.

Boot Loader Code Upgrade

Figure 3:
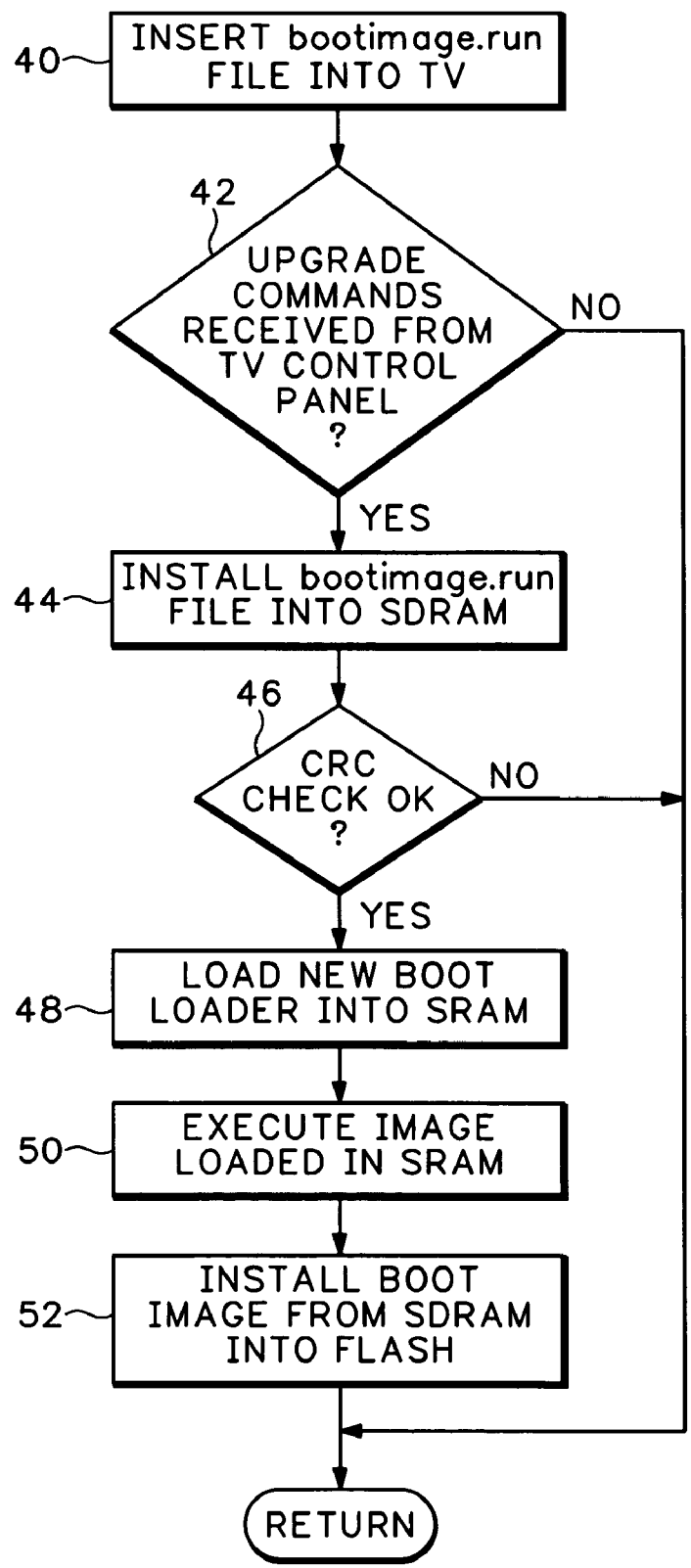
FIG. 3 is a flow diagram showing how the boot loader code is upgraded in the television system via a bootimage.run file.

Referring to FIGS. 1-3, the bootimage.run file is installed on the external memory device 22 and inserted in the TV 12 in block 40. The boot loader 30 (FIG. 2) starts the upgrade operation when a TV operator presses a certain combination of buttons on the control panel 20 (FIG. 1) in block 42. In block 44, the boot loader 30 executed by processor 34 loads the bootimage.run file from external memory 22 into SDRAM 38 (FIG. 2). A Cyclic Redundancy Check (CRC) check is performed on the bootimage.run file in block 46.

In one implementation, the CRC is a modulo 2 remainder calculated from the bootimage.run file, with the CRC bytes of the file all set to zero. If the CRC check confirms a valid file, portions of the bootimage.run file including a new boot loader 37 are loaded from SDRAM 38 into the SRAM 36 in block 48. The new boot loader 37 in SRAM 36 is then executed by processor 34 in block 50. The new boot loader 37 detects that it is executing from internal SRAM 36 and not from flash memory 29. This causes the new boot loader 37 in block 52 to program itself into flash memory 29. The TV 12 then operates using the newly upgraded boot loader in flash memory 29.

The ability to completely replace the code in flash memory 29, including the boot loader 30, memory map 31, and other executable code 32 and 33, provides more upgrade flexibility. For example, the memory map 31 can be completely reconfigured to locate different portions of the executable code associated with different operations into different memory spaces.

Executable Code Upgrade

Figure 4:
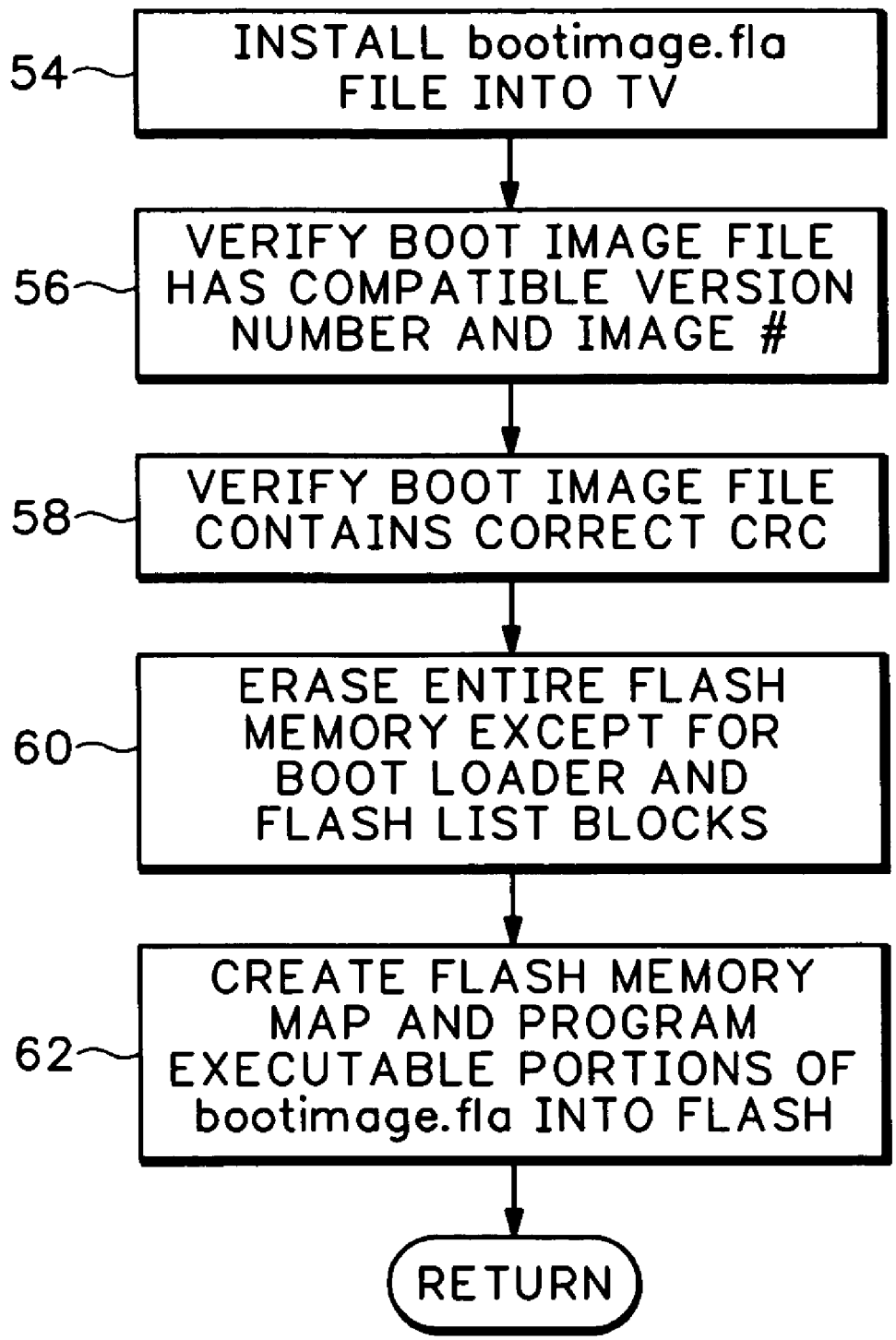
FIG. 4 is a flow diagram showing how the executable code is upgraded in the television system via a bootimage.fla file.

Referring to FIG. 4, the boot loader 30 performs the following operations after the external memory device 22 containing the bootimage.fla file is inserted in the TV 12 in block 54. In block 56, the boot loader 30 in flash memory 29 (FIG. 2) reads header information from the bootimage.fla file and verifies the header contains a correct magic number and compatible boot image format version number. A magic number can refer to any predetermined value. A range of compatible version numbers is normally included in the boot loader code.

In block 58, the boot loader 30 verifies the bootimage.fla file contains the correct CRC. This is similar to the CRC operation that is used when installing a bootimage.run file as described above in FIG. 3. In block 60, the entire flash memory 29 is erased except for the boot loader 30 and flash list blocks. In block 62, the memory map 31 is created and the executable code portions of the bootimage.fla file are programmed into the flash memory 29.

The boot loader 30 can also provide graphical feedback to the user on screen 16 (FIG. 1) while the bootimage.fla or bootimage.run files are being parsed and installed into flash memory 29. For example, check boxes may be displayed on screen 16 (FIG. 1) for each stage of the upgrade process. The check boxes displayed on screen 16 may indicate when the boot loader 30 is verifying file integrity, preparing onboard memory, loading a new program, and has completed the upgrade operation. The appropriate checked boxes are checked off on the screen 16 by the boot loader 30 as each step of the upgrade process is successfully completed.

Detailed Diagram of Television Computing System

Figure 5:
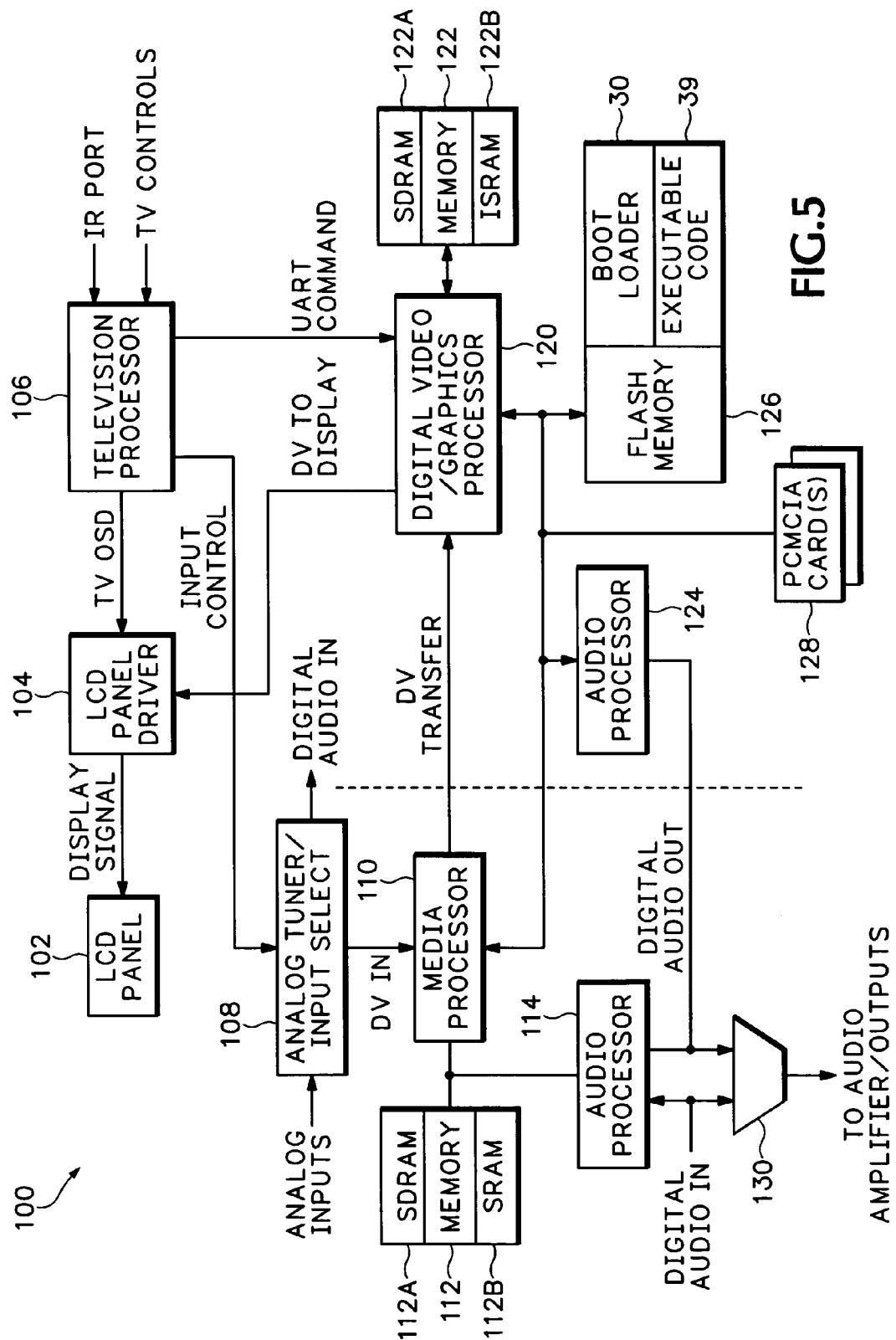
FIG. 5 is a detailed block diagram for a multiple processor television computing system.

FIG. 5 is a more detailed block diagram of a television computing system 100 that uses the upgrade system described above. In one embodiment, the television (TV) computing system 100 includes an LCD panel 102 to display visual output to a viewer based on a display signal generated by an LCD panel driver 104. The LCD panel driver 104 accepts a primary digital video signal, which may be in a CCIR656 format (eight bits per pixel $YC_bC_r$, in a "4:2:2" data ratio wherein two $C_b$ and two $C_r$ pixels are supplied for every four luminance pixels), from a digital video/graphics processor 120.

A television processor 106 (TV processor) provides basic control functions and viewer input interfaces for the television 100. The TV processor 106 receives viewer commands, both from control panel buttons 20 (FIG. 1) located on the television itself (TV controls) and from a handheld remote control unit (not shown) through its IR (Infra Red) Port. Based on the viewer commands, the TV processor 106 controls an analog tuner/input select section 108, and also supplies user inputs to a digital video/graphics processor 120 over a Universal Asynchronous Receiver/Transmitter (UART) command channel. The TV processor 106 is also capable of generating basic On-Screen Display (OSD) graphics, e.g., indicating which input is selected, the current audio volume setting, etc. The TV processor 106 supplies these OSD graphics as a TV OSD signal to the LCD panel driver 104 for overlay on the display signal.

The analog tuner/input select section 108 allows the television 100 to switch between various analog (or possibly digital) inputs for both video and audio. Video inputs can include a radio frequency (RF) signal carrying broadcast television, digital television, and/or high-definition television signals, NTSC video, S-Video, and/or RGB component video inputs, although various embodiments may not accept each of these signal types or may accept signals in other formats (such as PAL). The selected video input is converted to a digital data stream, DV In, in CCIR656 format and supplied to a media processor 110.

The analog tuner/input select section 108 also selects an audio source, digitizes that source if necessary, and supplies that digitized source as Digital Audio In to an Audio Processor 114 and a multiplexer 130. The audio source can be selected—independent of the current video source—as the audio channel(s) of a currently tuned RF television signal, stereophonic or monophonic audio connected to television 100 by audio jacks corresponding to a video input, or an internal microphone.

The media processor 110 and the digital video/graphics processor 120 (digital video processor) provide various digital feature capabilities for the television 100, as will be explained further in the specific embodiments below. In some embodiments, the processors 110 and 120 can be TMS320DM270 signal processors, available from Texas Instruments, Inc., Dallas, Tex. In one implementation, the digital video processor 120 functions as the central processor 34 described in FIG. 1, and the media processor 110 functions as a slave processor. The media processor 110 supplies digital video, either corresponding to DV In or to a decoded media stream from another source, to the digital video/graphics processor 120 over a DV transfer bus.

The media processor 110 performs MPEG (Moving Picture Expert Group) coding and decoding of digital media streams for television 100, as instructed by the digital video processor 120. A 32-bit-wide data bus connects memory 112, e.g., two 16-bit-wide×1M synchronous DRAM devices connected in parallel, to processor 110. In one implementation the memory 112 includes a SDRAM 112A and a SRAM 112B. An audio processor 114 also connects to this data bus to provide audio coding and decoding for media streams handled by the media processor 110.

The digital video processor 120 coordinates (and/or implements) many of the digital features of the television 100. A 32-bit-wide data bus connects a memory 122, e.g., two 16-bit-wide×1M synchronous DRAM devices connected in parallel, to the processor 120. In one embodiment, the memory 122 includes a SDRAM 122A and an Internal Static Random Access Memory (ISRAM) 122B. A 16-bit-wide system bus connects the digital video processor 120 to the media processor 110, an audio processor 124, flash memory 126, and removable PCMCIA cards 128. The flash memory 126 stores the boot loader code, configuration data, executable code, and Java code for graphics applications, etc. PCMCIA cards 128 can provide extended media and/or application capability. The digital video processor 120 can pass data from the DV transfer bus to the LCD panel driver 104 as is, and/or processor 120 can also supersede, modify, or superimpose the DV Transfer signal with other content.

The multiplexer 130 provides audio output to the television amplifier and line outputs (not shown) from one of three sources. The first source is the current Digital Audio In stream from the analog tuner/input select section 108. The second and third sources are the Digital Audio Outputs of audio processors 114 and 124. These two outputs are tied to the same input of multiplexer 130, since each audio processor 114, 124, is capable of tri-stating its output when it is not selected. In some embodiments, the processors 114 and 124 can be TMS320VC5416 signal processors, available from Texas Instruments, Inc., Dallas, Tex.

As can be seen from FIG. 5, the TV 100 is broadly divided into three main parts, each controlled by a separate CPU. Of course, other architectures are possible, and FIG. 5 only illustrates one example of this architecture. Broadly stated, and without listing all of the particular processor functions, the television processor 106 controls the television functions, such as changing channels, changing listening volume, brightness, and contrast, etc. The media processor 110 encodes audio and video (AV) input from whatever format it is received into one used elsewhere in the TV 100. The digital video processor 120 is responsible for decoding the previously encoded AV signals, which converts them into a signal that can be used by the panel driver 104 to display on the LCD panel 102.

In addition to decoding the previously encoded signals, the digital video processor 120 is responsible for accessing the PCMCIA based media 128, as described in more detail below. Other duties of the digital video processor 120 include communicating with the television processor 106, and hosting an IP protocol stack. In alternate embodiments the IP protocol stack may be hosted on processor 106 or 110.

A PCMCIA card is a type of removable media card that can be connected to a personal computer, television, or other electronic device. Various card formats are defined in the PC Card standard release 8.0, by the Personal Computer Memory Card International Association, which is hereby incorporated by reference. The PCMCIA specifications define three physical sizes of PCMCIA (or PC) cards: Type I, Type II, and Type III. Additionally, cards related to PC cards include SmartMedia cards and Compact Flash cards. Type I PC cards typically include memory enhancements, such as RAM, flash memory, one-time-programming (OTP) memory and Electronically Erasable Programmable Memory (EEPROM). Type II PC cards generally include I/O functions, such as modems, LAN connections, and host communications. Type III PC cards may include rotating media (disks) or radio communication devices (wireless).

The TV system 100 can connect to a computer or an information network either through a wired or wireless connection. A wired connection could be connected to the digital video processor 120, such as a wired Ethernet port, as is known in the art. Additionally, or alternatively, the TV system 100 can connect to an information network through a wireless port, such as an 802.11b Ethernet port. Such a port can conveniently be located in one of the PCMCIA cards 128, which is connected to the media processor 110 and the digital video processor 120. Either of these processors 110, 120 could include the network protocols and other necessary underlying layers to support network commands on a network client or host running on the processors 110, 120.

Executable Code and Boot Loader Code Upgrades

Figure 6:
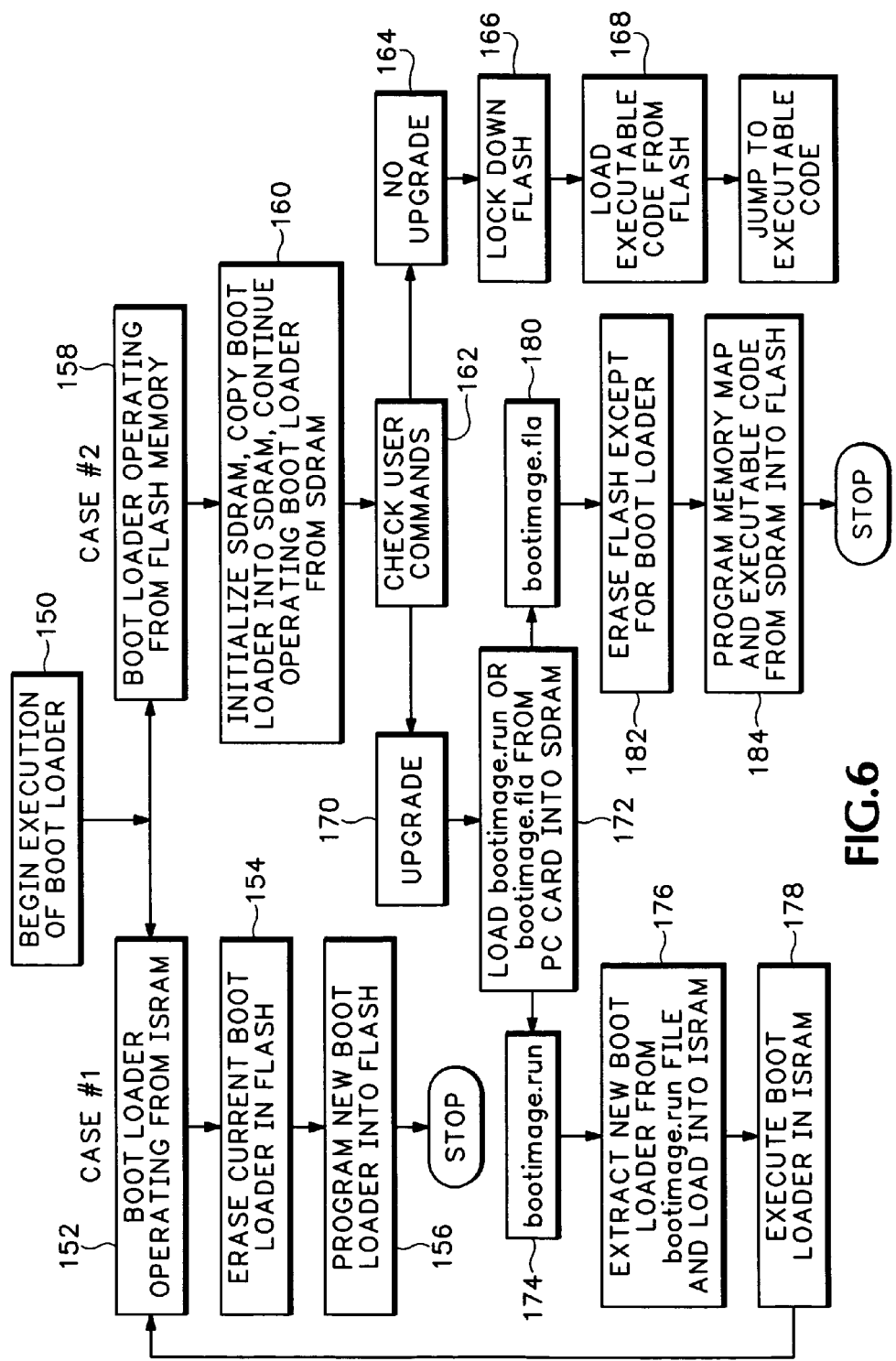
FIG. 6 is a flow diagram showing how the upgrades are performed for the television computing system shown in FIG. 5.

Referring to FIGS. 5 and 6, execution of the boot loader begins in block 150, for example, by the DVG processor 120 immediately upon power-up/reset or after being extracted from a bootimage.run file. The boot loader checks if it is operating in flash memory 126 or operating in ISRAM 122B.

Case 1: In block 152, the boot loader 30 determines it is operating in ISRAM 122B. The boot loader then erases the current boot loader in flash memory 126 in block 154 and programs itself into flash memory 126 in block 156 and then does nothing.

Case 2: In block 158, the boot loader 30 determines it is operating from flash memory 126. The boot loader in block 160 initializes SDRAM 122A and copies itself into SDRAM 122A and continues execution from SDRAM 122A. In block 162, the boot loader now operating in SDRAM 122A checks with the television processor 106 for user upgrade commands. The television processor 105 may inform the boot loader to conduct an upgrade operation. If no upgrade command is detected from the television processor 106, the boot loader conducts a normal executable code load operation where the executable code from flash memory 126 is loaded into different components in the television computing system 100.

If the television processor 106 signifies to load the executable code (no upgrade) in block 164, the boot loader operating in SDRAM 122A locks down flash memory 126 in block 166 to prevent corruption (prevents erasure/programming). The boot loader then proceeds in block 168 to load and execute the executable code, such as executable code 32 and 33 in FIG. 2, from flash memory 126.

If an upgrade is signaled by the television processor 106 in block 170, the boot loader operating in SDRAM 122A loads a bootimage.run or bootimage.fla from the PC card 128 into SDRAM 122A in block 172. If the bootimage.run file is detected in block 174, the boot loader operating in SDRAM 122A extracts the new boot loader code, and loads it into ISRAM 122B in block 176. The boot loader then proceeds to execute the boot loader loaded into ISRAM 122B in block 178. This brings the upgrade operation back to case 1 in block 152.

If a bootimage.fla file is detected on the PC card 128 in block 180, the bootimage.fla file is loaded into SDRAM 122A and the flash memory 126 is erased in block 182 except for the boot loader block, flash list blocks, or possibly other memory areas or blocks as desired. In block 184, the new memory map and the executable code is programmed from SDRAM 122A into flash memory 126.

If the boot loader is somehow corrupted, the TV must be returned to the factory for reprogramming of the flash memory 126. However, this is not true if only the executable code is corrupted. The boot loader and the executable code are designed as described above to be upgraded separately using two different files bootimage.run and bootimage.fla. This prevents a total corruption situation.

Ideally, the boot loader would never need to be upgraded. However, if it is necessary to upgrade the boot loader, the time required to erase and program the boot loader in flash memory 126 is minimal, around one second. On the other hand, the time required to erase and program the executable code can take around five minutes.

If power is lost during an executable code upgrade, the executable code could be corrupted. However, the DVG processor 120 can still boot because the boot loader in flash memory 126 would still be valid. Another attempt at upgrading the executable code would therefore be possible.

It is also possible to design the boot loader to simply program the boot loader code on the PC card 128 into flash memory 126 when it recognizes a bootimage.run file. However, designing the boot loader in flash memory 126 to first load the new boot loader from the PC card 128 into ISRAM 122B and then execute the boot loader in the ISRAM 122B before programming itself into the flash memory 126 as described above, provides another level of protection against corruption of the boot loader.

Flash Memory Map

FIG. 7 shows one example of the memory map 31 (FIG. 1) which identifies the boot loader 30 starting at the beginning of flash memory, followed by addresses and sizes. Of course, this is only one example. The specific memory map 31 varies depending on the hardware and software configuration of the computing system.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A Television (TV) computing system, comprising:
   internal memory configured to store both a current boot loader code and current executable code for configuring different devices in the TV computing system, wherein the internal memory includes a first memory device configured to store the current boot loader code and current executable code, and a second memory device configured to execute upgraded boot loader code;
   an external interface for providing the upgraded code; and
   a processor configured to automatically replace the current executable code or current boot loader code in the internal memory with upgraded executable code or upgraded boot loader code provided by the external interface,
   the processor configured to determine whether a boot loader is being operated from the first memory device or the second memory device,
   upgrade the first memory device with the upgraded boot loader code when the boot loader is operating from the second memory device; and
   copy the current boot loader from the first memory device into the second memory device and operate the boot loader from the second memory device when the boot loader is detected as initially operating from the first memory device.

2. The TV computing system according to claim 1 wherein the internal memory includes a third memory device separate from the first and second internal memory device storing and executing the current boot loader code while upgrading the executable code in the first memory device or loading the executable code into the computing system for execution.

3. The TV computing system according to claim 1 wherein the boot loader code after starting execution checks for a user initiated boot upgrade operation when operating from the first memory device and automatically upgrades the boot loader code when operating from the second memory device.

4. The TV computing system according to claim 3 wherein the first memory device is flash memory and the second memory device is a Random Access Memory (RAM).

5. The TV computing system according to claim 1 wherein the external interface includes an external memory device that connects to the TV computing system and stores boot image files.

6. The TV computing system according to claim 5 wherein the processor upgrades the current executable code when a first boot image file is identified on the external memory device and upgrades the current boot loader code when a second boot image file is identified on the external memory device.

7. The TV computing system according to claim 6 wherein the processor upgrades the current executable code or current boot loader only when the boot image file is verified with a correct version and Cyclic Redundancy Check (CRC) value.

8. The TV computing system according to claim 1 including a television control interface wherein the processor automatically upgrades the current executable code or the current boot loader code with the upgraded executable code or upgraded boot loader code only when a predetermined combination of buttons are pressed on the television control interface.

9. A method for upgrading software in a television system, comprising:
   operating executable code in the television system for running television applications;
   receiving an external file in the television system that contains executable code upgrades;
   automatically replacing the executable code in the television with the executable code upgrades for operating new or upgraded television applications; and
   copying a boot loader from a first memory into a second memory and operating the boot loader from the second memory when the boot loader initially begins execution from the first memory.

10. The method according to claim 9 including automatically replacing the executable code in the television system when the external file has a first predetermined file name and a predetermined combination of buttons are pressed on a television control panel.

11. The method according to claim 10 including automatically replacing the boot loader in the television system when the external file has a second predetermined file name and a predetermined combination of buttons are pressed on a television control panel.

12. The method according to claim 9 wherein the first memory is a flash memory and the second memory is a Random Access Memory (RAM).

13. The method according to claim 9 including:
conducting a Cyclic Redundancy Check (CRC) on the external file; and
replacing the executable code with the executable code upgrades only when the external file passes the CRC.

14. A method for upgrading software in a television system, comprising:
operating executable code in the television system for running television applications;
receiving an external file in the television system that contains executable code upgrades; and
automatically replacing the executable code in the television with the executable code upgrades for operating new or upgraded television applications;
starting execution of a boot loader;
determining whether the boot loader is operating from a first internal flash memory or from a second internal memory;
upgrading a boot loader in the flash memory when the boot loader is operating from the second internal memory; and
loading the executable code from the flash memory within the television system when the boot loader is operating from the flash memory.

15. The method according to claim 14 including:
copying the boot loader from the flash memory into the second internal memory and operating the boot loader from the second internal memory when the boot loader is detected as operating from the flash memory.

16. The method according to claim 15 including:
checking for user commands indicating a boot upgrade request while operating the boot loader from the second internal memory;
loading the executable code from the flash memory within the television system when no boot upgrade request is detected;
loading a boot image file from external memory into the second internal memory when a boot upgrade request is detected;
upgrading the boot loader in flash memory when a first boot image file is loaded from the external memory; and
upgrading the executable code in flash memory when a second boot image file is loaded from the external memory.

17. A computing system, comprising:
a first memory containing a boot loader and executable code;
a second memory; and
a processor using the boot loader for loading the executable code in the computing system,
the processor replacing the executable code in the first memory when upgrade commands are detected and a first external boot image file is loaded and replacing the boot loader in the first memory when the upgrade commands are detected and a second external boot image file is loaded, wherein the processor copies the boot loader from the first memory into the second memory and continues operating the boot loader from the second memory when the boot loader initially begins execution from the first memory.

18. The computing system according to claim 17 wherein the processor loads the boot loader from the first memory into the second memory and runs the boot loader from the second memory when replacing the executable code in the first memory or when loading the executable code from the first memory in the computing system.

19. The computing system according to claim 18 wherein the first memory is flash memory and the second memory is a first Random Access Memory (RAM).

20. A computing system, comprising:
a first memory configured to store a boot loader and executable code, wherein the first memory is flash memory;
a second memory, wherein the second memory is a first Random Access Memory (RAM); and
a processor configured to:
use the boot loader for loading the executable code in the computing system, load an upgraded boot loader from external memory into a second RAM, and execute the upgraded boot loader in the second RAM while replacing the boot loader in flash memory with the upgraded boot loader, wherein the processor initially begins execution by checking to see if the boot loader is operating from the flash memory or from the second RAM and automatically upgrades the boot loader in the flash memory when the boot loader is operating from the second RAM.

21. The computing system according to claim 20 wherein the processor retains a copy of the boot loader from the first flash memory in the first RAM while operating the upgraded boot loader in the second RAM.

* * * * *